United States Patent
Ong

(10) Patent No.: US 8,112,545 B1
(45) Date of Patent: Feb. 7, 2012

(54) DISTRIBUTED NETWORK ADDRESS TRANSLATION CONTROL

(75) Inventor: Lyndon Y. Ong, San Jose, CA (US)

(73) Assignee: Rockstar Bidco, LP, New York, NY (US)

(*) Notice: Subject to any disclaimer, the term of this patent is extended or adjusted under 35 U.S.C. 154(b) by 0 days.

(21) Appl. No.: 09/742,683

(22) Filed: Dec. 19, 2000

(51) Int. Cl.
*G06F 15/16* (2006.01)

(52) U.S. Cl. ......... 709/238; 709/202; 709/226; 709/231

(58) Field of Classification Search .................. 709/227, 709/238, 239, 203, 245, 249, 202, 226, 231; 370/401, 389
See application file for complete search history.

(56) References Cited

U.S. PATENT DOCUMENTS

| | | | | |
|---|---|---|---|---|
| 6,047,325 A | * | 4/2000 | Jain et al. ...................... | 709/227 |
| 6,353,614 B1 | * | 3/2002 | Borella et al. ................ | 370/389 |
| 6,535,511 B1 | * | 3/2003 | Rao ............................... | 370/392 |
| 6,717,949 B1 | * | 4/2004 | Boden et al. .................. | 370/401 |
| 6,801,949 B1 | * | 10/2004 | Bruck et al. .................. | 709/232 |
| 6,839,766 B1 | * | 1/2005 | Parnafes et al. .............. | 709/232 |

OTHER PUBLICATIONS

Durham, et al., "The COPS (Common Open Policy Service) Protocol", The Internet Society, Jan. 2001, p. 36.*

* cited by examiner

*Primary Examiner* — David Lazaro
(74) *Attorney, Agent, or Firm* — Withrow & Terranova, PLLC

(57) ABSTRACT

A distributed network address translation (NAT) system is used to transport data packets between private and public network domains. A packet modifier substitutes public and private network address information in packets that are crossing between public and private domains to and from the end system. A network application server has an address mapping table and communicates with the packet modifier over a control protocol. The network application server generates address mappings which the packet modifier uses for modification of data packets passing through it.

8 Claims, 7 Drawing Sheets

DISTRIBUTED NETWORK ADDRESS TRANSLATION CONTROL

BACKGROUND OF THE INVENTION

1. Field of the Invention

The present invention is directed to digital communications networks. More specifically, the invention is directed to digital communications networks which use Network Address Translation systems to translate between IP addresses in a private network and IP addresses in a public network.

2. Background of the Related Art

As it is known in the art, network communication processes are divided into multiple standardized stages, or layers, and each layer is assigned a specific task necessary for network communication. A widely used network communication standard is the Open System Interconnection (OSI) standard developed by the International Standards Organization (ISO). The OSI communication model 110 shown in FIG. 1 divides network communication into seven layers 120-180. Each layer has a predefined, standardized mechanism for communicating with the layer immediately above it and immediately below it. In this manner, any layer may be modified or optimized without requiring modification of any other layer as long as the same standardized mechanism is used to communicate with adjacent layers.

The first layer 120 is the physical layer and it describes the hardware medium for transmitting and receiving a logic 1 and a logic 0. The second layer 130 is the data link layer and it translates messages into correct format for the physical layer 120 to transmit, and translates messages received by the physical layer 120 for upper layers to understand. Basically the data link layer 130 formats messages into data frames that encapsulate the messages and adds customized information, including a CRC code, destination address information, and source address information. The third layer 140 is the network layer and its main function is to direct data from a source network to a destination network, typically using a network address or similar unique indicia. This third layer 140 is sometimes called the Internet Protocol or IP layer since its job is basically to route messages and provide a standard network interface for upper layers.

The fourth layer 150, the transport layer, manages end-to-end control of communications links, e.g., determining whether all packets have arrived, and implements error-checking and data integrity features. A common protocol used here is the Transmission Control Protocol. The fifth layer 160 is often called the session layer. This layer sets up, coordinates, and terminates conversations, exchanges, and dialogs between applications on each side of the end-to-end connection. The presentation or syntax layer 170, layer six, is usually part of an operating system and converts incoming and outgoing data from one presentation format to another. Finally, layer seven, the application layer 180, is the layer at which communication partners are identified, quality of service is identified, user authentication and privacy are considered, and any constraints on data syntax are identified.

As a part of the network layer described above, digital communication networks such as the Internet provide communication services using addressable data packets. That is, when a computer system associated with a server on the Internet sends data to a system associated with a different server, it provides packets of the data to a router in the server. A router is a device or software package, connected between a network and a source of network traffic such as a server or the like, that determines where to send traffic generated by the server. The router adds to the packets inter alia a source address of the system which generated them and a destination address of the system where they are to be received, and sends them out onto the network. Different packets may take different paths to reach the destination. At every server node the packets pass through, they are received and forwarded in the best direction of the receiver system by routers in the nodes. This may entail consulting tables within the router to determine the best router to which to forward an incoming packet, determining the best router to handle a given type of traffic, determining the best router to handle a given volume of traffic, and the like.

Destinations of packets are represented by thirty-two bit IP addresses that are typically represented as a string of four eight bit, decimally represented numbers such as 127.58.123.1. The significance of fields in IP addresses, the method of assigning them, distributing, accessing and handling them and the like are known in the art and are not relevant to the present invention; thus, they will not be described in greater detail herein.

For a number of reasons, it is often desirable for a local network, i.e., a physically relatively small network having end systems connected thereto, to be able to have an addressing system different from that of a larger distributed network (such as the Internet) to which the local network is connected. For example, the use of different addressing systems inside and outside the local network adds to the security of the local network because there is typically only a random statically or dynamically assigned relationship between end system IP addresses as seen within the network (the private addresses) and those as seen outside of the network (the public addresses). This makes tracing and similar hacking activities difficult. Further, although some local networks may host many end systems, only a few of them at a time will need access outside the local network, e.g., to the Internet. Thus, rather than providing each end system with its own unique IP address, the router may simply map requests from end systems for Internet connections to a few IP addresses (or even a single address) assigned to the entire local network on an ad hoc basis.

One way to implement this ability is through the use of a Network Address Translator (NAT) device. Generally speaking, network address translation is the process of translating from an IP address used in one network to an IP address used in another network. In this arrangement, the local or private network is typically called the inside network, while its counterpart is called the outside network. The NAT device is typically a hardware device or computer-based software package that is part of a router. FIG. 2 shows a typical NAT arrangement. Here, a remote system 10 is connected via a public network 15 to a NAT 20 in a local/private/inside network 30 between the public network 15 and end systems 40 within the private network 30. The NAT 20 includes an address mapping table 25 for mapping traffic between end systems 40 and remote systems 10 on the public network 15.

The end systems 40 communicate with a network application server 50 via an application control signaling connection such as Megaco/H.248 or the like. The network application server 50 controls the establishment of the service by the end systems 40 and controls the address substitution being done on the packets by the NAT 20. Alternatively, the network application server 50 may be eliminated. In this case, the NAT 20 will make address substitutions based on its own stateful inspection.

Consider now the process of translating outgoing traffic from the local network 30 as shown in FIG. 3. Here, a local end system 40 having an address on the private network 30 of, e.g., 5.5.5.5 (its "inside local" address) wishes to send data to a remote system 10 having an outside address of, e.g., 10.10.10.10 (its "outside global" address). The local end system 40 sends the data to the NAT 20 along with an indication that the data is from inside address 5.5.5.5 and is intended for the remote system 10 at address 10.10.10.10. This may be done, e.g., by including source and destination address fields of 5.5.5.5 and 10.10.10.10 in the packets.

Upon receiving the data packets from the local end system 40, the NAT 20 inspects the packet headers and (in a simple case) by accessing its address mapping table 25 sees that the local end system 40 which has an inside address of 5.5.5.5 is directly mapped to an outside address of 20.20.20.20 (the "inside global" address of the end system 40). Thus, it replaces the inside source address of 5.5.5.5 in the packets with the outside address of 20.20.20.20. Then, the data packets may be released to the public Internet network 15.

Note the use of the terminology inside local address, inside global address, etc. above. These terms as used herein may be most easily remembered by noting that the first word indicates the network, private (inside) or public (outside), to which the address applies, while the second work indicates whether the address is being used by a system connected to the private (local) or public (global) network. Thus, an outside local address is an address used by an end system 40 on the private network 30 to address a system connected to the public Internet 15.

In the reverse operation shown in FIG. 4, receiving data from outside the local network 30, the NAT 20 receives data packets which have a source address of 10.10.10.10 and a destination address of 20.20.20.20. The NAT 20 looks in its address mapping table 25 and finds that the outside address 20.20.20.20 is mapped to the inside address of 5.5.5.5. The NAT 20 performs these substitutions in the packet headers (other manipulations may be necessary as well, such as recalculating checksums and the like) and passes the packets on to the end system 40.

As noted above, FIGS. 3 and 4 represent perhaps the simplest cases of NAT 20 operation. Variations are of course possible and in fact are more common. For example, in the above system the NAT 20 performed a mapping of the end system 40. There was no need to map the remote system 10, since it is connected to the public network 15 and is expected to have a unique address, in contrast to the end system 40 which has an address from a subset reserved for use by private systems. The private address is not unique and may be reused by other private networks, but the public address should be usable in both public and private.

In some cases, however, it may be desirable to map both the address of the end system 40 and the address of the remote system 10. For example, this may be necessary if the private network allocates addresses outside of the private use subset and causes a conflict with public addresses. This situation is usually avoided; however, it may still happen if, e.g., there is a merger of companies so that two divisions have conflicting addresses.

It will be understood that as used herein and in the appended claims, the address mapping table 25 is intended to include not only tables or other data structures having entries associating inside and outside IP addresses but other functionality enabling a similar operation, e.g., functionality for randomly or round robin association of a group of addresses and the like.

Also, the end system 40 may not have an outside address specifically associated with it. In that case, if the private network 30 has multiple outside IP addresses allocated to it, it may select one of the allocated outside IP addresses for temporary association with the end system 40. As above, the selected outside address can be associated with the end system 40 in an entry in the address mapping table 25 and, once the session between the end system 40 and the remote system 10 is completed, the entry may be deleted and the outside address reallocated to the pool.

Rather than selecting an IP address at random from the pool, the NAT 20 may, for load balancing purposes, choose addresses on a round robin basis.

SUMMARY OF THE INVENTION

Although the NAT technique works well in practice, it requires that the router or other packet handling device have intelligence built in to determine when a new stream has arrived. The packet handling device needs to be intelligent to know what address/port values should be used when substituting source and destination fields. The packet handling device needs to be software intensive for stateful inspection of packet fields and hardware intensive to handle packet manipulation at wirespeed. In some cases it is difficult for a single device to do both. For example, in voice over IP (VoIP) the control protocol is separate from the voice packet stream, and several different protocols and variants exist, e.g., H.323, SIP, MGCP, Megaco/H.248, etc.

The present invention has been made in view of the above problems of the prior art, and provides a distributed network address translation (NAT) system for transporting data packets between private and public network domains. According to an aspect of the invention, a packet modifier substitutes public and private network address information in packets that are crossing between public and private domains to and from the end system. A network application server has an address mapping table and communicates with the packet modifier over a control protocol. The network application server generates address mappings which the packet modifier uses for modification of data packets passing through it.

This technique solves the problem of having to add intelligence to the packet handling device in order to determine when a new stream has arrived and what address/port values to use when swapping these fields. Rather than handling everything in one device, which needs to be both software-intensive for stateful inspection of packet fields and hardware-intensive to handle packet manipulation at wirespeed, operational requirements can be reduced by distributing the hardware and software-intensive portions of the NAT to system components which most easily accommodate and support them.

BRIEF DESCRIPTION OF THE DRAWINGS

These features and advantages of the present invention are better understood by reading the following detailed description of an embodiment, taken in conjunction with the accompanying drawings, in which.

DETAILED DESCRIPTION OF EXEMPLARY EMBODIMENT

As can be seen from the above discussion of the prior art, the NAT functionality encompasses two separate functions: manipulation of IP header fields and message fields to swap IP addresses and/or port numbers from an internal range to an external range and vice-versa, depending on whether the packet is incoming or outgoing; and maintenance of a table or pool of free external addresses that can be allocated to new streams of incoming or outgoing information. The present invention recognizes that these two functions can readily be split into two separate devices and a control protocol introduced between them.

The NAT packet manipulation function, for example, may be located in a device that efficiently does packet manipulation, such as a router or packet manipulator in a router. However, it is more complex for the router to identify new flows of information and do address allocation appropriately. In contrast, the address pool can be maintained at a separate server or multiple servers. For example, a pool may be maintained at a caller communications server that is aware of new information flows stemming from new voice over IP (VoIP) calls entering or leaving the private network. This can be separate from a pool maintained at another device such as a standard stateful firewall, which inspects regular incoming and outgoing data streams.

A control protocol such as the Common Open Policy Service for Provisioning protocol (COPS-PR) can be used between the two devices to inform the packet manipulator as to what incoming address/port pairs should be manipulated and which internal/external addresses/ports to use when swapping those fields in the packet. Thus, by splitting the functions, an intelligent node such as a communications server which already has knowledge of when new streams will be created can do the handling of address pools and communicate via a control protocol to a packet manipulator device such as a router or routing switch to do the actual swapping of fields. The control protocol can establish a session relationship between the pool manager and allow the pool manager to push down new address mapping relationships to the packet manipulator.

Thus, the basic method of developing a NAT is:
separate out the packet manipulation and address pool management functions of a NAT;
optionally split the address pool among different pool managers, e.g., one pool for data streams and another pool for voice and multimedia streams;
define a control protocol that allows the address pool manager to communicate with the packet manipulation device and specify new mappings to apply, or old mappings to discontinue.

Figure 1:
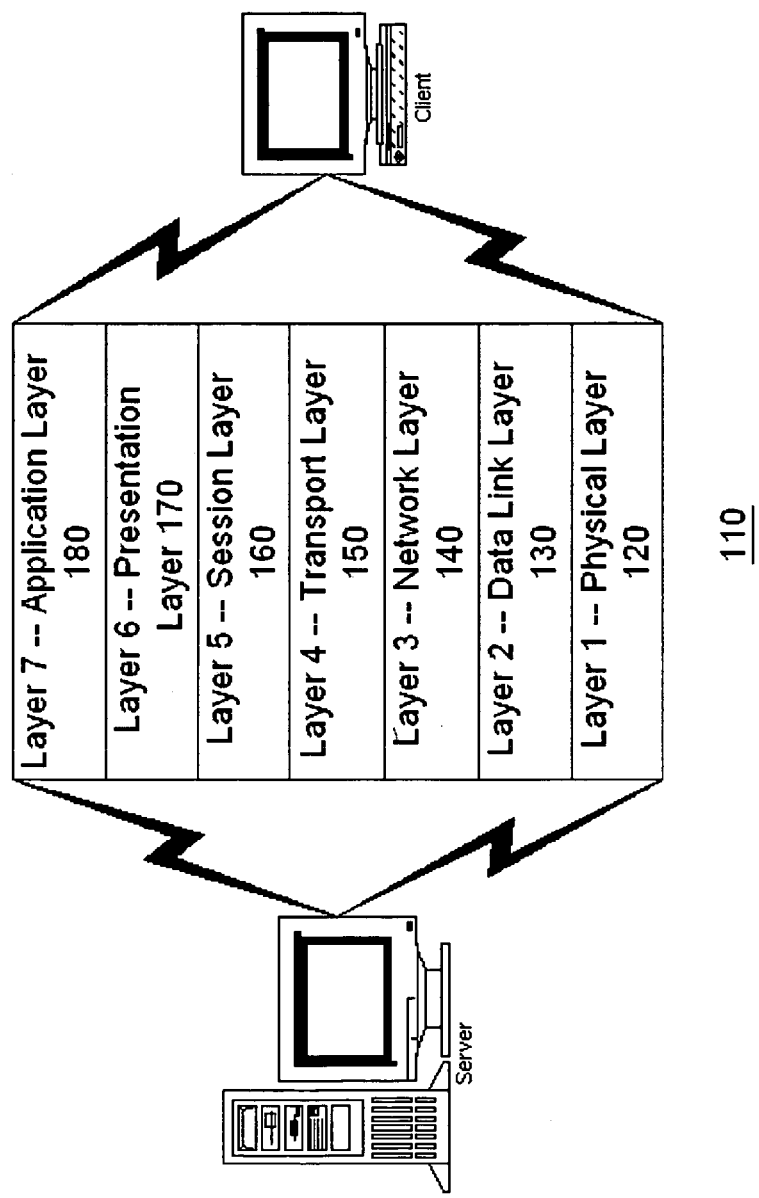
FIG. 1 shows an OSI reference model according to the prior art.
Figure 2:
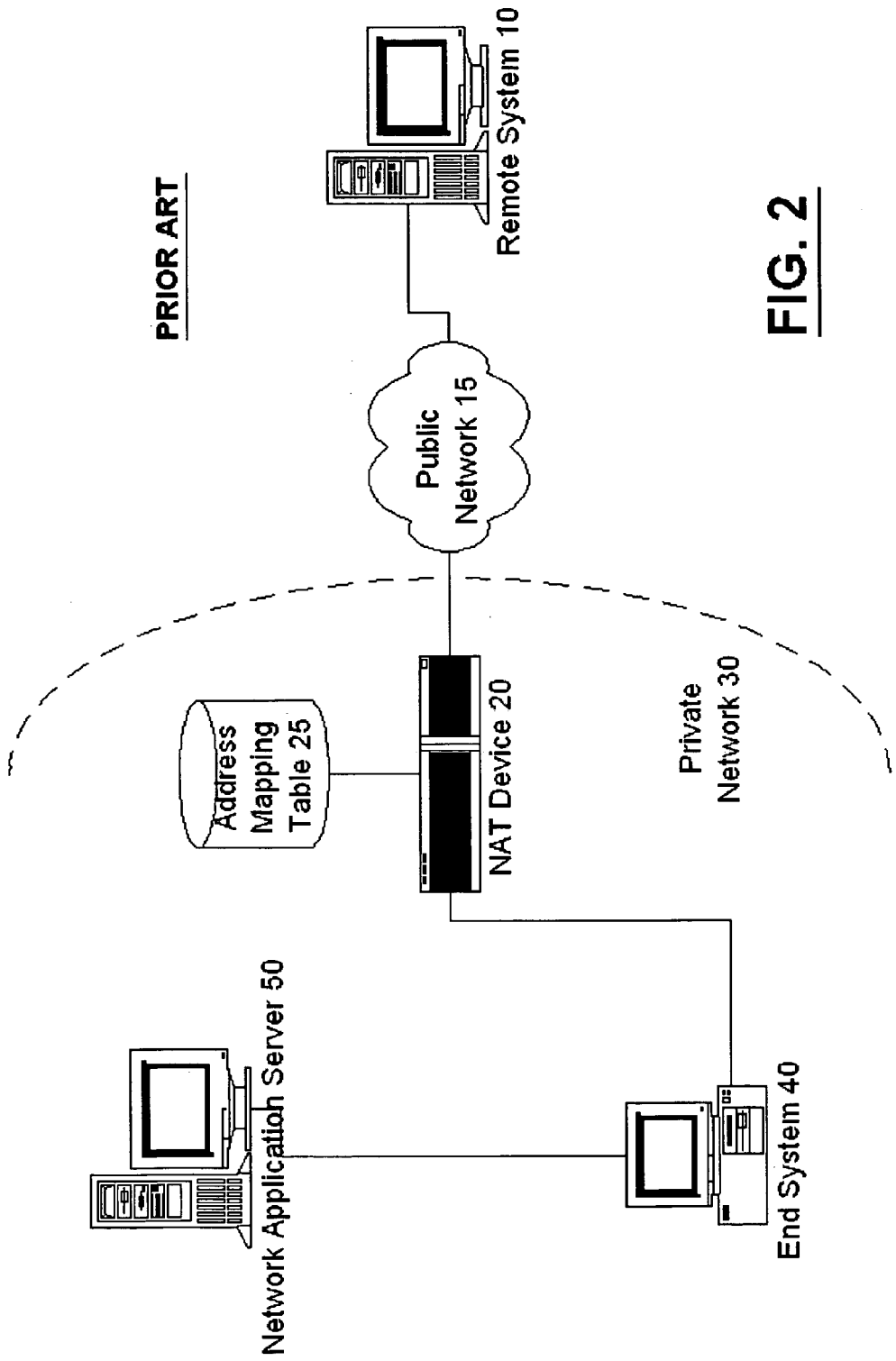
FIG. 2 shows a network system using a NAT as known in the art.
Figure 3:
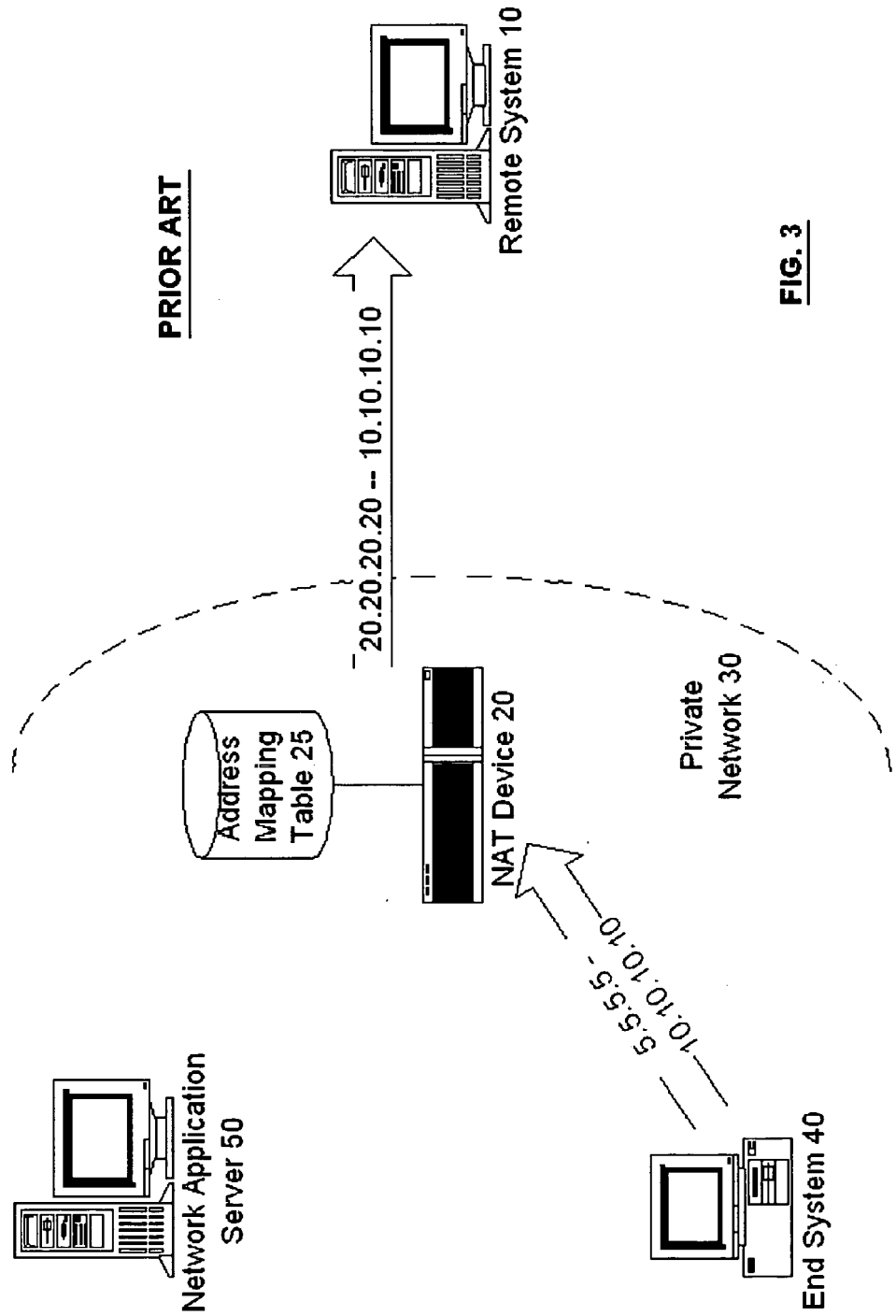
FIG. 3 shows the translation of outgoing traffic in the NAT system of FIG. 2.
Figure 4:
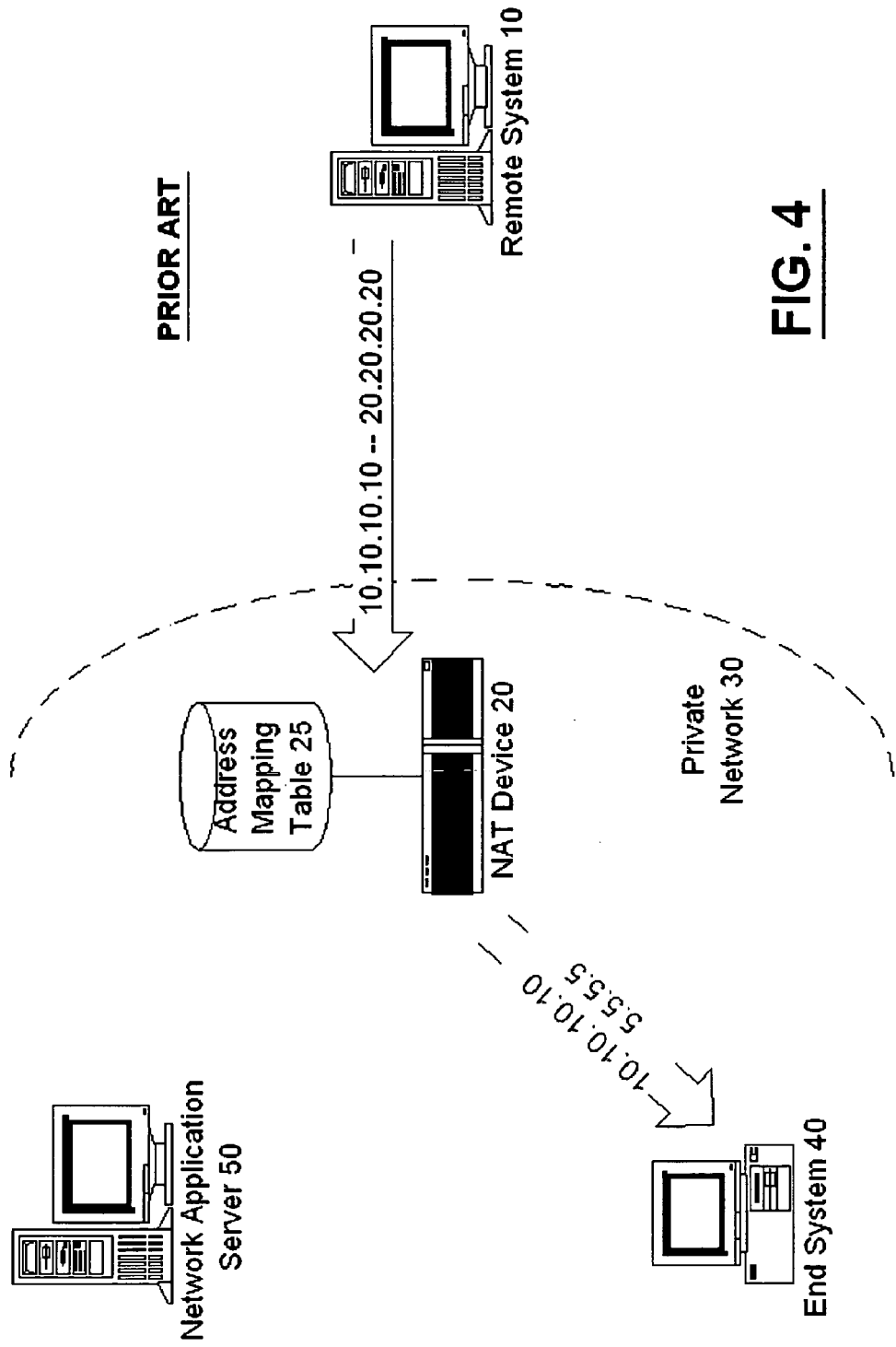
FIG. 4 shows the translation of incoming traffic in the NAT system of FIG. 2.
Figure 5:
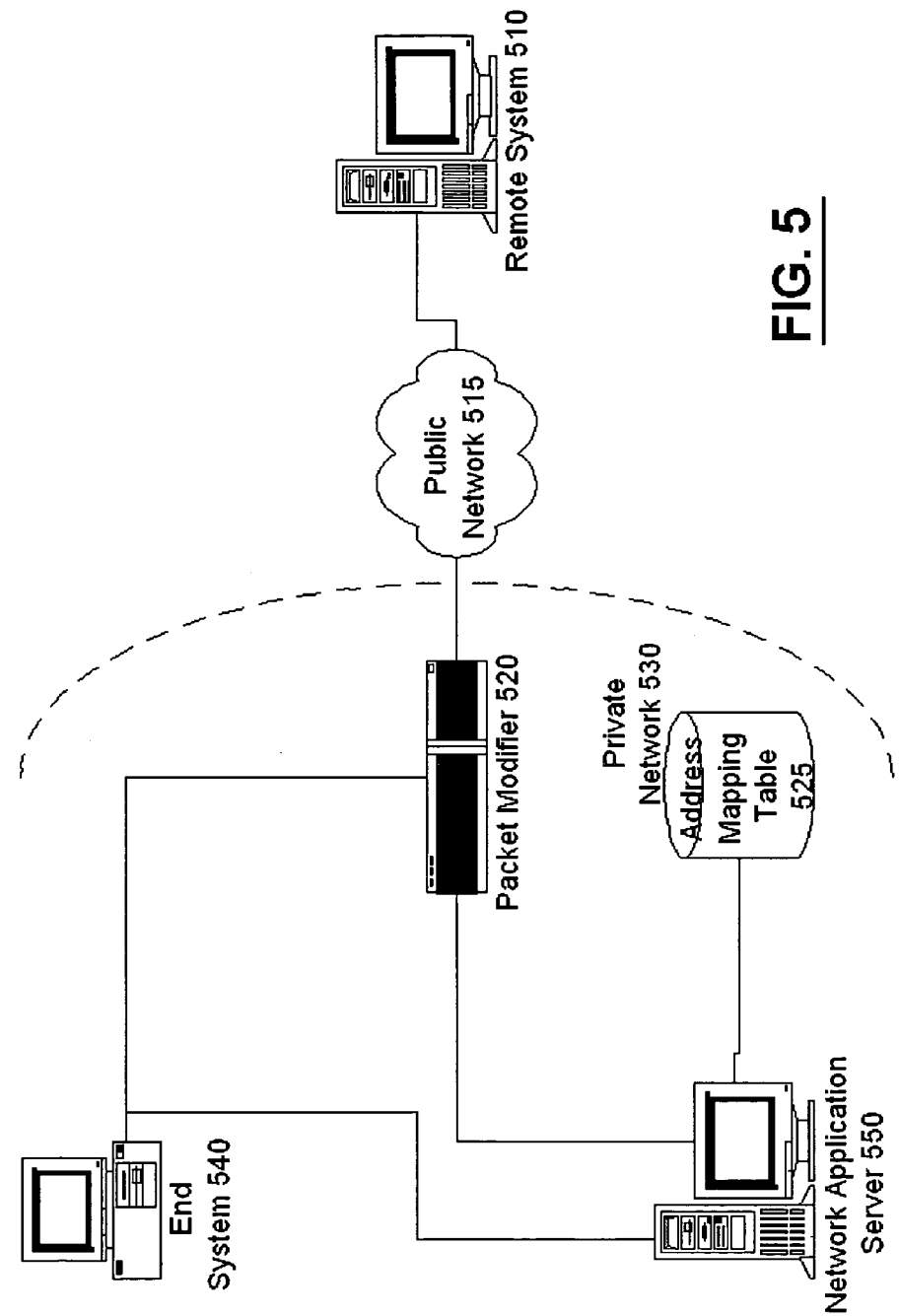
FIG. 5 shows a distributed NAT system according to an embodiment of the present invention.

FIG. 5 generally shows a distributed NAT according to a preferred embodiment of the present invention. Here, as before the end system 540 generates data packets which have a source address internal to a private network 530 and delivers them to a packet modifier 520 (possibly within a router) which sends them to the remote system 510 as data packets having a source which is publicly mapped to the private network 530. However, now in addition to providing application control signaling to the end system 540, the network application server 550 provides a control interface to the packet modifier 520. In this way, the network application server 550 can use its address mapping table 525 to provide addresses for use in mapping by the packet modifier 520.

As noted above, the distributed NAT system can support multiple pool management servers, each being allocated some portion of the available public addressing space. The most appropriate allocation of space amongst a group of servers will be fact-specific for a particular application. Multiple servers can be connected on a control bus with the packet modifier. The packet modifier would have a single interface, and each server could use a different session on that interface to send control commands. In this way, all of the servers are able to send control commands to the packet modifier via the bus.

Figure 6:
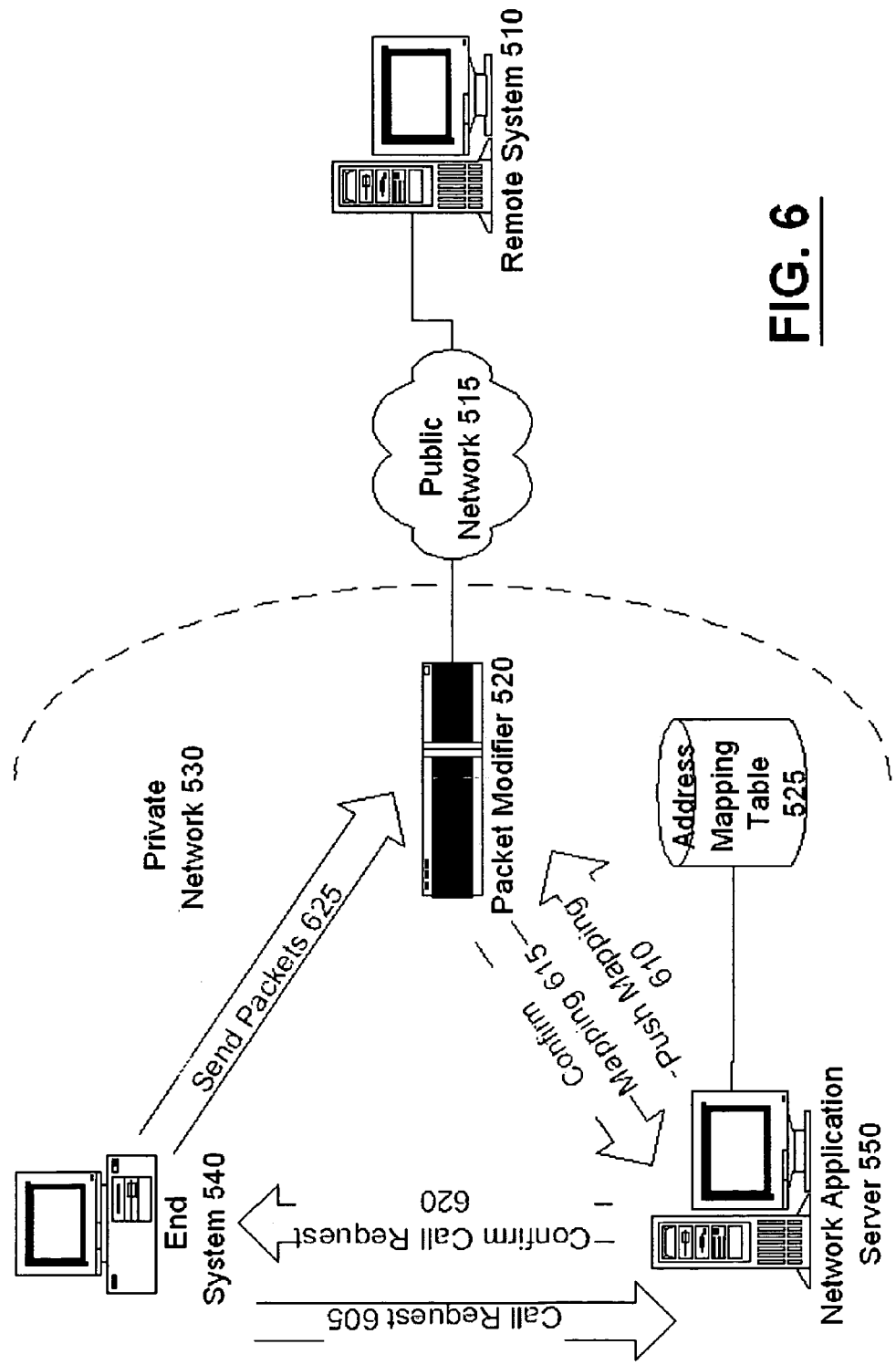
FIG. 6 shows the operation of the embodiment when handling VoIP traffic.

Operation of the preferred embodiment in handling VoIP traffic is shown in FIG. 6. First, In 605, the end system 540 wishes to establish a communication session with a remote system 510 and initiates a call request to the network application server 550 using, e.g., MGCP or Megaco. Using the address mapping table 525, the network application server 550 determines a mapping between inside and outside network addresses according to predetermined rules such as those described above and pushes the mapping down to the packet modifier device 520 using the COPS protocol in 610. Typically, the address will be assigned for some period of time, but will return to the address pool if not used in an active session.

Preferably, the mapping is encapsulated in a COPS command and is of the form

{(IL, IG) (OL, OG)} where IL is the inside local address of the end system 540,
IG is the inside global address mapped to IL;
OL is the outside local address of the remote system 510; and
OG is the outside global address mapped to OL.

A COPS message consists of a header and a series of objects, so one way of implementing the mapping would be to add new objects for, e.g., IL/IG mapping and OL/OG mapping.

In 615 the packet modifier confirms receipt of the mapping request as, e.g., a COPS-PR "Report State (RPT)" message advising whether or not the requested operation was carried out successfully. This confirmation step is used because the packet modifier 520 might not be able to carry out the action due to, e.g., not enough local memory.

After returning the mapping request confirmation, the packet modifier stores the new mapping generated by the network application server 550 for use in substituting subsequent addresses. Then, in 620 the network application server confirms the call request to the end system 540. As above, this is done because the packet modifier 520 might reject the mapping request, in which case the application server 550 should terminate the call rather than let it go ahead without packet modification services. Alternatively, a request failure might occur for policy reasons, e.g., because the end system 540 is not allowed to make outside calls.

Depending on the particulars of the system, call control signaling can be sent either directly from the end system 540 or from the network application server 550 to establish the session with the remote system 510.

Once the communication session is established, the end system 540 can send packets to the remote system 510 using its own inside local address as the source and the remote system's outside local address as the destination address for the packets in 625. Since the address mapping table 525 correctly reflects the mapping of these addresses to global addresses, the packet modifier 520 can properly translate them to an inside global address and an outside global address, respectively.

That is, during this session, whenever the packet modifier 520 receives a packet from end system 540 (at address IL) destined for remote system 510 (at address OL), it substitutes IG for IL and OG for OL, recalculates any address-dependent packet parameters such as checksums and the like, and passes the packet on to the public network 515.

Figure 7:
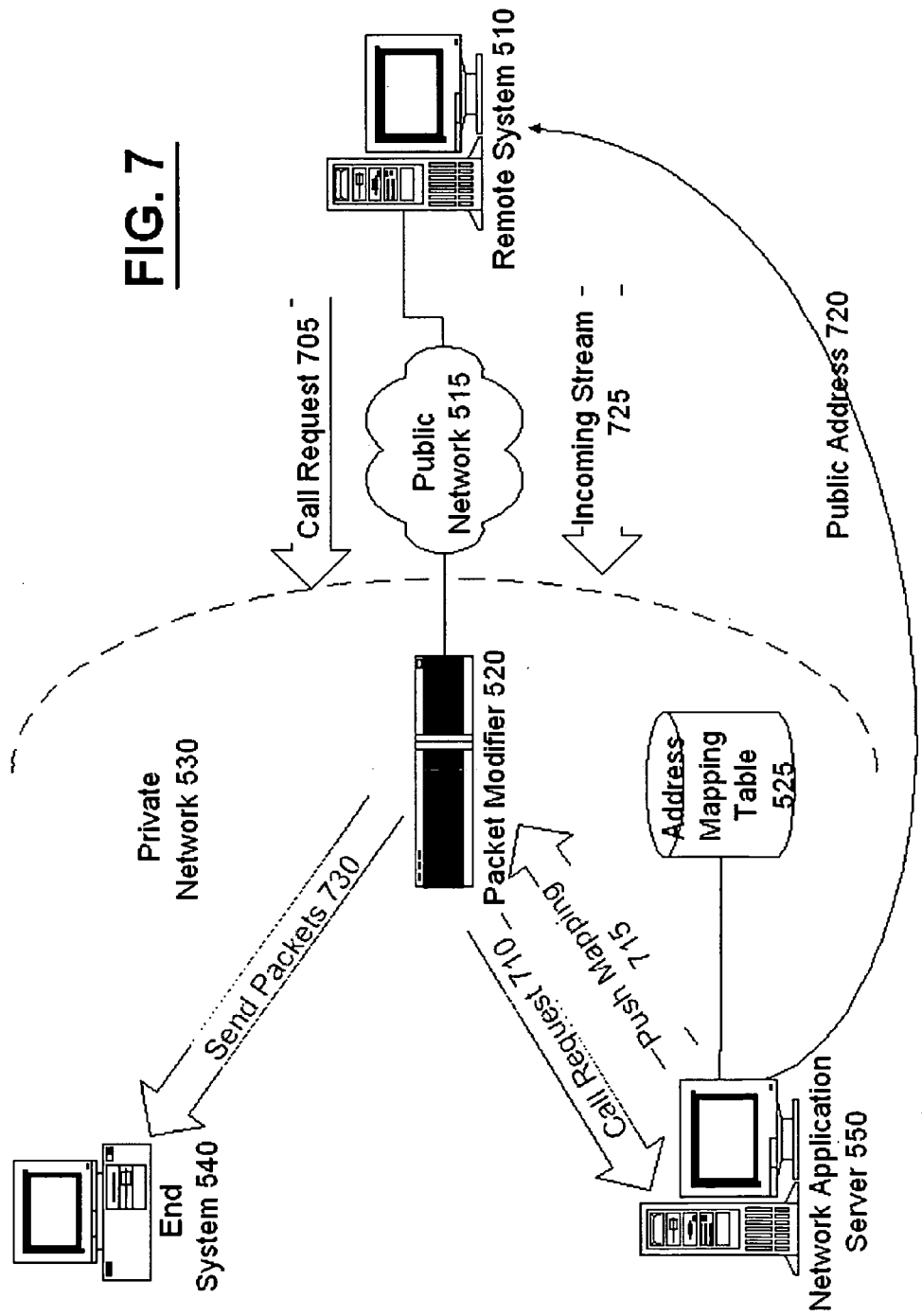
FIG. 7 shows the operation of the embodiment illustrated in FIG. 6 when the remote system wishes to call the end system.

In the opposite transaction, i.e., when the remote system 510 wishes to call the end system 40, as shown in FIG. 7 it first needs a public address, such as that of the packet modifier 520, to which it can request setup of a new call and so in 705 sends a call request via the public network 515. Upon receiving the new call request from the remote system 510, the packet modifier 520 forwards the request to the application server 550 in 710. The application server 550 then in 715 sends a control message to the packet modifier 520 telling it what mapping to apply and in 720 sends a message to the remote system 10 accepting the call and providing a public address to which it may send packets, e.g., VoIP packets. Thus, the packet modifier 520 is told to look for that address and translate it to the inside local address of end system 540. Thus, when the remote system 510 later sends a data stream to the supplied address in 725, it is reliably mapped to the end system 540 in 730.

The methods and implementing apparatus of the present invention have been described in connection with the preferred embodiments as disclosed herein. Although exemplary embodiments of the present invention have been shown and described in detail herein, along with certain variants thereof, other varied embodiments which incorporate the teachings of the invention may easily be constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. In other instances, well known structures are not shown in detail but can readily constructed by those skilled in the art.

What is claimed is:

1. A private communications network comprising:
    an end system configured to communicate with a remote system via a network separate from the private communications network, the end system configured to communicate in at least a voice stream mode and a data stream mode;
    a first network application server configured to receive a voice stream request sent by the end system, the first network application server including a first pool of addresses stored in a first address mapping table, and configured to generate a first address mapping responsive to the voice stream request;
    a second network application server configured to receive a data stream request sent by the end system, the second network application server including a second pool of addresses stored in a second address mapping table, and configured to generate a second address mapping responsive to the data stream request, wherein the second pool of addresses differs from the first pool of addresses; and
    a packet modifier device, separate from the first and second network application servers and configured to receive the first address mapping from the first network application server when the end system sends the voice stream request and the second address mapping from the second network application server when the end system sends the data stream request, and to use the received address mapping to map communication packets from the end system for transmission on the separate network, wherein the first network application server and the second network application server are not in a path of the communication packets.

2. The private communications network of claim 1, wherein:
    the end system is configured to communicate with the remote system by sending the communication packets to the packet modifier device; and
    the packet modifier device is configured to map the communication packets from the end system by substituting at least one of source and destination addresses in the communication packets according to the received address mapping.

3. The network of claim 2, wherein the packet modifier device is configured to substitute at least a source address in the communication packets.

4. The network of claim 1, wherein the first and second network application servers are configured to provide the first address mapping and the second address mapping, respectively, to the packet modifier device via a command according to a predetermined protocol.

5. A method of mapping packets in a communication network, the method comprising:
    allocating a first pool of addresses to a first address mapping table associated with a first network application server, the first network application server adapted to provide an address mapping from the first pool of addresses to a packet modifier device upon a request from an end system to establish a voice stream with a remote system associated with a separate network;
    allocating a second pool of addresses to a second address mapping table associated with a second network application server, the second network application server adapted to provide an address mapping from the second pool of addresses to the packet modifier device upon a request from the end system to establish a data stream with the remote system;
    receiving, by the first network application server, a voice call request from the end system to establish the voice stream between the end system and the remote system;
    providing, by the first network application server, a first address mapping to the packet modifier device in response to the voice call request; and
    modifying, at the packet modifier device, a plurality of voice packets sent from the end system to the remote system according to the first address mapping, wherein the first network application server and the second network application server are not in a path of the voice stream.

6. The method of claim 5, wherein modifying the plurality of voice packets includes modifying the plurality of voice packets by substituting addresses of the plurality of voice packets corresponding to the end system.

7. The method of claim 5, wherein providing the first address mapping to the packet modifier device in response to the voice call request further comprises providing the first address mapping to the packet modifier device in response to the voice call request via a command protocol.

8. A packet modifier device associated with a first communications network, comprising:
    a communications interface configured to communicate with the first communications network;
    a processor coupled to the communications interface and configured to:
        receive a first address mapping from a first network application server upon a request by an end system associated with the first communications network to establish a voice stream with a remote system associated with a second communications network, the first address mapping based on a first pool of addresses maintained by the first network application server;

receive a second address mapping from a second network application server upon a request by the end system to establish a data stream with the remote system, the second address mapping based on a second pool of addresses maintained by the second network application server, wherein the second pool of addresses is different from the first pool of addresses;

map a stream of voice packets from the end system destined for the remote system in accordance with the first address mapping; and map a stream of data packets from the end system destined for the remote system in accordance with the second address mapping, wherein the first network application server and the second network application server are not in a path of either the voice packets or the data packets.

* * * * *